United States Patent Office 3,102,099
Patented Aug. 27, 1963

3,102,099
METHOD OF MANUFACTURING MONO-
CRYSTALLINE BODIES
Andreas Leopoldus Stuijts, Eindhoven, Netherlands, assignor to North American Philips Company, Inc., New York, N.Y., a corporation of Delaware
No Drawing. Filed June 4, 1958, Ser. No. 739,694
Claims priority, application Netherlands June 22, 1957
4 Claims. (Cl. 252—62.5)

This invention relates to methods of manufacturing monocrystalline bodies. Such monocrystalline bodies are used in those cases in which anisotropic bodies are required. More particularly the invention relates to the manufacture of monocrystalline bodies consisting of ferromagnetic oxidic compounds having a hexagonal crystal structure. Such anisotropic ferromagnetic bodies are used inter alia in micro-wave equipment. In comparison with isotropic bodies built up from crystals of the same compound, the initial permeability of monocrystalline bodies is increased in certain directions.

In "Science," 124, pages 9–13, 1956, known processes are described for manufacturing monocrystalline bodies more particularly of oxidic compounds, which will be briefly mentioned hereinafter.

In the "crucible method" nucleation occurs in a small volume of the melt and the crystal growth is determined by diffusion. This process, which requires a pure atmosphere and which does not permit contamination of the crucible, is suitable only for compounds melting congruently, which are compounds of which the solid phase and the liquid phase, which are in balance with each other have the same composition.

In the "withdrawal method," the crystallisation is induced with a "cold finger," in most cases with a small inoculation crystal attached to it. By utilising a temperature gradient, the inoculation crystal may grow into a monocrystalline body. This method may successfully be applied to compounds melting congruently.

For growing refractory materials use is substantially made of the "flame fusion method." In the flame of an oxyhydrogen burner, powder taken along through the inner tube of the burner is heated and collected on a thermo-resistant rod. The molten powder may then coagulate into a monocrystalline body. This method, with a few exceptions, can be applied only to compounds melting congruently.

In these three cases the method is carried at the melting temperature of the pure compounds. It is necessary for the gaseous atmosphere to be matched to the balance of the compound at this temperature. Consequently, in the case of ferromagnetic oxidic compounds, said methods can successfully be used only for a limited number, for example $MnFe_2O_4$ and $Fe_3O_4$.

In the "flux melt method," which is also described in "Science," the monocrystalline body in the case of refractory compounds is manufactured from the melt which, in addition to the pure compound, contains one or more further compounds. It is then necessary to find a low-melting compound (a flux) which forms an eutectic melt with the compound, of which monocrystalline bodies are to be manufactured. The choice of the flux is determined firstly by the relative solubility of flux and compound, secondly by the fact that the flux and the compound do not enter into reaction, and thirdly by the solubility of the flux, that is to say, the possibility of removing the flux adhered in the solid state to the monocrystalline body. For this method knowledge of the phase diagram is essential for success. The process is governed by diffusion and the nucleation cannot be influenced.

Comparable to this "flux melt method" is the manufacture of monocrystalline bodies by cooling a solution of the compound concerned, for example in water, alcohol or similar liquids. In such cases it is possible for the conditions of the process, such as purity of the solution and temperature to be controlled to an extent such that the nucleation can be influenced chiefly because the temperatures used in this method are at most 100° C.

According to the known methods, it is thus impossible to manufacture monocrystalline bodies of refractory compounds from a system of more than one component wherein the nucleation can be influenced. Such influencing is necessary for obtaining monocrystalline bodies of reasonable size. With a nucleation which is not controlled, a large number of monocrystalline bodies of small size are obtained. The present invention provides a method in which the nucleation can certainly be influenced.

In the method according to the invention a monocrystalline body is manufactured in that a melt contained in a crucible is slowly cooled down while its surface is locally maintained at a temperature a little lower than that of the remaining part of the melt. More particularly in the method according to the invention, a monocrystalline body is manufactured from a ferromagnetic oxidic compound having a hexagonal crystal structure in that during the slow cooling of a homogeneous melt of the compound and a flux manufactured in a crucible of rare metal the surface of the melt by means of gas flow is locally maintained at a temperature somewhat lower than than of the melt. As in the "flux melt method," the choice of the flux is determined by the relative solubility of compound and flux, non-reacting of compound and flux and the solubility of the flux. Use is made of a crucible of rare metal, in order to obtain as homogeneous a distribution of temperature as possible and avoid a reaction between the gaseous atmosphere or the melt and the crucible. The flow of gas by means of which the surface is locally maintained at a somewhat lower temperature has a composition similar to that of the gaseous atmosphere above the melt, and this in turn is determined on the ground of the balance required for obtaining the compound concerned at the temperature prevailing. The melt must be homogeneous, that is to say, that the melt consists of one homogeneous liquid phase, since otherwise unwanted germination occurs. During this treatment, a monocrystal is separated from the over-saturated melt at its surface due to the temperature gradient which locally prevails on the surface, further separation from the solid phase being effected so that the monocrystal grows into a plate-shaped monocrystalline body, while in other parts of the melt unwanted germination does not occur or occurs to a very small extent only. It has been found that the monocrystalline body thus formed keeps floating on the surface of the melt, while the body nevertheless can acquire a thickness of 3 mms.

More particularly in the method according to the invention, the monocrystalline body formed is removed from the melt before the melt completely coagulates. This removal from the melt is desirable if a monocrystalline body of comparatively large size is required. Cooling then takes place to a temperature at which molten phase is still present, that is to say to a temperature which exceeds the eutectic temperature. The monocrystalline body formed is removed from the melt because the monocrystalline body has a hexagonal crystal structure. With cooling in the solid state, the monocrystalline body contracts anisotropically, whereas the coagulated melt behaves isotropically. If the monocrystalline body and the coagulated melt cool down together, tensions occur which lead to fracture of the monocrystalline body.

The monocrystalline body may be removed in different ways, for example by scooping the body from the melt by means of a sieve which, during cooling is present in the melt and the temperature of which is maintained at the temperature of the melt. This is necessary, since otherwise a temperature gradient occurs in the melt which may lead to unwanted germination. It is alternatively possible for the body to be sucked up from the surface. If desired, this may be effected by means of the tube through which the local flow of gas is supplied above the melt.

The temperatures at which the manufacture according to the invention takes place are wholly dependent upon the phase diagram of the compound and the flux. The eutectic melt coagulates at a given temperature and the monocrystalline body must therefore be removed from the melt at a higher temperature. The more the composition of the melt approaches that of the eutectic, the lower is the melting temperature of the mixture, but the smaller is the yield. The more the composition of the melt approaches that of the pure compound, the larger is the yield, that is to say, the larger or the more bodies are formed, but the mixture melts at a correspondingly higher temperature and the cooling rate must in this case be controlled much more accurately, since in such a concentrated melt unwanted germination occurs more readily. Furthermore, realisation of the gaseous atmosphere necessary for forming the relevant compound at this temperature is more complicated as the temperature is higher.

A practical advantage of the method according to the invention is that several monocrystalline bodies may be manufactured in any easy manner. When a monocrystalline body has been removed from the melt, oxides or compounds of metals are added to the melt to an amount corresponding to the quantity present in the monocrystalline body manufactured, the whole being heated to the temperature at which in the first instance the homogeneous melt was manufactured, whereafter a second monocrystalline body is manufactured in a similar manner, etc. etc.

The method according to the invention is used more particularly for manufacturing monocrystalline bodies of ferromagnetic oxidic compounds having a hexagonal crystal structure, the composition of which may be represented by the general formula $xAO \cdot yMeO \cdot zFe_2O_3$ with $x>0$ and $z>x+y$, wherein A represents at least one of the bivalent metals Ba, Sr, Pb and Ca and wherein Me represents at least one of the bivalent metals Fe, Mn, Co, Ni, Zn, Mg, Cu or the bivalent complex $$\frac{Li^I + Fe^{III}}{2}$$

for example $$BaO \cdot 6Fe_2O_3$$

or

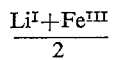
$$BaFe_{12}O_{19}$$
$$3SrO \cdot 2CoO \cdot 12Fe_2O_3$$

or

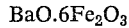
$$Sr_3Co_2Fe_{24}O_{41}$$
$$2(Ba, Sr)O \cdot 2(Zn, Fe^{II})O \cdot 6Fe_2^{III}O_3$$

or

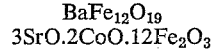
$$(Ba, Sr)_2(Zn, Fe^{II})_2Fe_{12}^{III}O_{22}$$

and $$(Ba, Sr)O \cdot 2CoO \cdot 8Fe_2O_3$$

or

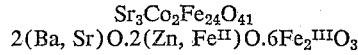
$$(Ba, Sr)Co_2Fe_{16}O_{27}$$

As a flux for these compounds use may be made of compounds or mixtures of compounds of AO and $Fe_2O_3$, in which the ratio A:Fe varies from 1:1 to 1:2. This is naturally possible only in those cases in which the flux does not enter into reaction with the compound. It is possible for the flux adhered to the monocrystalline body to be dissolved by boiling in an acid.

In practice, it is not necessary for the homogeneous melt to be manufactured from the compound, of which the monocrystalline body will be manufactured, and the flux. The melt may alternatively be manufactured from a mixture of metal oxides or compounds of metals in which such oxides are present in ratios corresponding to the composition of the desired melt of compound and flux.

*Example I*

$BaCO_3$, $SrCO_3$, ZnO and $Fe_2O_3$ were mixed in a ratio corresponding to 6.3 mol percent of $BaCO_3$, 34.2 mol percent of $SrCO_3$, 6.3 mol percent of ZnO and 53.2 mol percent of $Fe_2O_3$ and having a total weight of about 45 gms. Pills were pressed of this mixture and stacked in a platinum crucible. Use was made of pills in order to obtain more favourable filling of the crucible. The platinum crucible was placed in a vertical tubular oven in a manner such that the crucible was at the centre of the heat zone of the oven. The upper end of the oven was closed by means of a cover in which two large holes and a small hole were provided, its lower end being open. The one large hole was closed by means of a small cover and the other was connected to a gas pipe. A thin tube was introduced through the small hole into the oven. A flow of oxygen of 2 litres/min. was introduced at the upper end through the one large hole, whereupon the oven was put into operation. Through another hole in the cover it was observed that the mass had homogeneously melted at 1222° C. This temperature was determined pyrometrically at the lower side of the platinum crucible. The small tube was now brought closely above the surface of the homogeneous melt and a flow of oxygen of 0.2 litre/min. was blown through this tube onto the surface. It was thus ensured that the surface of the melt locally had a somewhat lower temperature. The oven was subsequently cooled at a rate of about 3° C./hour. The first small crystals were visible at 1212° C. From this temperature the melt was cooled at a rate of about 1° C./hour. The melt had coagulated at 1164° C. Then several large crystals had formed, which, according to an X-ray diffraction examination, had a structure similar to that of the compound $Ba_3Zn_2Fe_{24}O_{41}$, that is the structure, of which the elementary cell in the hexagonal crystal system may be described with a c-axis of about 52.3 A. and an a-axis of about 5.9 A. According to an analysis, the ratio Ba:Sr in the crystals was found to be 1:2 and the crystals were found to contain 0.80% by weight of FeO. The composition of the crystals thus corresponds to that according to the formula

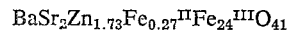
$$BaSr_2Zn_{1.73}Fe_{0.27}{}^{II}Fe_{24}{}^{III}O_{41}$$

*Example II*

In the manner described in Example I, a mixture was melted in a platinum crucible having a composition of 4.7 mol. percent of ZnO, 36.8 mol. percent of $BaCO_3$ and 58.5 mol. percent of $Fe_2O_3$ and having a total weight of about 120 gms. The mixture had homogeneously melted at 1332° C. At this temperature, a platinum sieve was immersed under the surface of the melt and the sieve was electrically heated to about the temperature of the melt. A monocrystalline body was now manufactured in the manner described in Example I. At 1324° C., the first crystals might be seen below the tube through which a flow of oxygen of 2 litres/min. was locally blown onto the surface. At 1320° C., one crystal had grown to an extent such that its diameter was several centimetres. The oven was now again heated to 1325° C. and at this temperature the body obtained was lifted out of the melt by means of the platinum sieve. After cooling, the body was deprived of the residue of the melt by boiling with a 2 N HCl-solution.

According to an X-ray diffraction examination, the body had a crystal structure similar to that of the compound $Ba_3Zn_2Fe_{24}O_{41}$. According to an analysis, the body contained 1.3% by weight of FeO. The composition thus corresponds to that of the formula

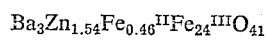
$$Ba_3Zn_{1.54}Fe_{0.46}{}^{II}Fe_{24}{}^{III}O_{41}$$

Example III

In the manner described in Example I, several monocrystalline bodies were manufactured from 45 gms. of an initial mixture of the composition corresponding to 41.9 mol. percent of $SrCO_3$ and 58.1 mol. percent of $Fe_2O_3$. The mass had homogeneously melted at 1259° C. and the melt coagulated at about 1180° C.

According to an X-ray diffraction examination, the crystals were found to have a structure similar to that of the compound $BaFe_{12}O_{19}$, that is the hexagonal crystal structure having a $c$-axis of about 23.3 A. and an $a$-axis of about 5.9 A. The composition of the crystals thus corresponds to that according to the formula $SrFe_{12}O_{19}$.

Example IV

In the manner described in Example I, several crystals were manufactured from a melt homogenized at 1306° C. and having a composition of 3.8 mol. percent of $BaCO_3$, 37.1 mol. percent of $SrCO_3$, 7.6 mol. percent of $CoCO_3$ and 51.5 mol. percent of $Fe_2O_3$. Several thick crystals were formed (2–3 mms. thick) which, according to an X-ray diffraction examination, were found to have a structure similar to that of the compound $BaFe_2^{II}Fe_{16}^{III}O_{27}$, that is the structure, of which the elementary cell in the hexagonal crystal system may be described with a $c$-axis of about 32.8 A. and an $a$-axis of about 5.9 A. According to an analysis, the ratio Ba:Sr in the crystals was 21:79 and the crystals were found to contain 0.79% by weight of FeO. The composition of the crystals thus corresponds to that according to the formula $$Ba_{0.21}Sr_{0.79}Co_{1.83}Fe_{0.17}^{II}Fe_{16}^{III}O_{27}$$

Example V

In the manner described in Example I, several crystals were manufactured from a melt homogenized at 1203° C. and having a composition of 3.8 mol. percent of $BaCO_3$, 37.9 mol. percent of $SrCO_3$, 6.8 mol. percent of ZnO and 51.5 mol. percent of $Fe_2O_3$, and having a total weight of 40 gms. The first germs formed at 1200° C. and grew out into several large crystals. The melt had coagulated at about 1160° C.

According to an X-ray diffraction examination, the crystals were found to have a structure similar to that of the compound $Ba_2Zn_2Fe_{12}O_{22}$, that is the rhombohedric crystal structure, of which the elementary cell in the hexagonal crystal system may be described with a $c$-axis of about 43.5 A. and an $a$-axis of about 5.9 A. According to an analysis, the ratio Ba:Sr in the crystals was 1:3 and the crystals were found to contain 0.74% by weight of FeO. The composition of the crystals thus corresponds to that according to the formula $$Ba_{0.5}Sr_{1.5}Zn_{1.86}Fe_{0.14}^{II}Fe_{12}^{III}O_{22}$$

Example VI

In the manner described in Example I, crystals were manufactured from a melt homogenized at 1225° C. and having a composition corresponding to 9.1 mol. percent of $BaCO_3$, 30.9 mol. percent of $SrCO_3$, 9.1 mol. percent of $CoCO_3$ and 50.9 mol. percent of $Fe_2O_3$ and a total weight of 45 gms. The first germs formed at 1214° C., two of which grew into fairly large crystals.

According to an X-ray diffraction examination, the crystals were found to have a structure similar to that of the compound $Ba_2Zn_2Fe_{12}O_{22}$. According to an analysis, the ratio Ba:Sr in the crystals was 43:57 and the crystals were found to contain no bivalent Fe-ions. The composition thus corresponds to that according to the formula $Ba_{0.86}Sr_{1.14}Co_2Fe_{12}O_{22}$.

Example VII

In the manner described in Example I, crystals were manufactured from a melt homogenized at 1193° C. and having a composition corresponding to 4.1 mol. percent of $BaCO_3$, 37.2 mol. percent of $SrCO_3$, 8.3 mol. percent of $CoCO_3$ and 50.4 mol. percent of $Fe_2O_3$ and a total weight of 45 gms. The first germs formed at 1185° C. and grew into a large crystal having a diameter of about 2 cms. and several thin hexagonal crystals each having a diameter of 2 to 3 mms.

According to an X-ray diffraction examination, the crystals were found to have a structure similar to that of the compound $Ba_2Zn_2Fe_{12}O_{22}$. According to an analysis, the ratio Ba:Sr in the crystals was 1:4 and the crystals were found to contain no bivalent Fe-ions. The composition thus corresponds to that according to the formula $$Ba_{0.4}Sr_{1.6}Co_2Fe_{12}O_{22}$$

Example VIII

In the manner described in Example I, a platinum crucible was placed in a vertical tubular oven. The crucible contained pressed pills made of a mixture of $BaCO_3$, $SrCO_3$, $CoCO_3$ and $Fe_2O_3$ in a ratio corresponding to 4.1 mol. percent of $BaCO_3$, 37.2 mol. percent of $SrCO_3$, 8.3 mol. percent of $CoCO_3$ and 50.4 mol. percent of $Fe_2O_3$ and having a total weight of about 160 gms. A flow of oxygen of 4 litres/min. was introduced at the upper end through a hole provided in the cover. The mixture had melted and was homogenized at 1223° C. A flow of oxygen of 0.3 litre/min. was blown through a small tube onto the surface of the homogeneous melt. Several large crystals formed during the slow cooling (about 1° C./hour). After heating to 1222° C. a crystal having a cross-section of about 1.5 cm. and a thickness of 1 mm. was sucked by means of vacuum to the small tube and lifted from the melt. This body was purified of the attached melt by boiling in a 2 N HCl-solution.

After the crystal had been lifted out of the melt, the contents of the crucible were again melted and homogenized at 1225° C. At 1210° C., again crystals were formed, one of which was removed from the melt in the manner described. The melt coagulates at 1182° C.

According to an X-ray diffraction examination, the crystals had a structure similar to that of the compound $Ba_2Zn_2Fe_{12}O_{22}$. According to an analysis, the ratio Ba:Sr in the crystals was 1:4 and the crystals are found to contain 0.14% by weight of FeO. The composition of the crystals thus corresponds to that according to the formula $Ba_{0.4}Sr_{1.6}Co_{1.98}Fe_{0.02}^{II}Fe_{12}^{III}O_{22}$.

Example IX

In the manner described in Example I, a crystal was manufactured from a melt homogenized at 1191° C. and having a composition corresponding to 4.9 mol. percent of $BaCO_3$, 37.8 mol. percent of $SrCO_3$, 5.0 mol. percent of $CoCO_3$ and 52.3 mol. percent of $Fe_2O_3$ and having a total weight of 45 gms. At 1182° C., the first germs formed, one of which grew into a body having a diameter of about 3 cms. and a thickness of 1 to 2 mms. The melt had coagulated at about 1150° C.

According to an X-ray diffraction examination, the crystal was found to have a structure similar to that of the compound $Ba_3Zn_2Fe_{24}O_{41}$. According to an analysis, the ratio Ba:Sr in the crystal was 21:79 and the crystal was found to contain 0.11% by weight of FeO. The composition of the crystal thus corresponds to that according to the formula $Ba_{0.63}Sr_{2.37}Co_{1.96}Fe_{0.04}^{II}Fe_{24}^{III}O_{41}$.

Example X

In the manner described in Example I, crystals were manufactured from a melt homogenized at 1193° C. and having a composition corresponding to 40.9 mol. percent of $SrCO_3$, 7.6 mol. percent of $CoCO_3$ and 51.5 mol. percent of $Fe_2O_3$ and a total weight of 45 gms. At 1183° C. the first germs formed and grew out into several crystals each having a surface of about 1 cm.² and a thickness of 1 mm. The melt had coagulated at about 1150° C.

According to an X-ray diffraction examination, the crystals had a structure similar to that of the compound $Ba_3Zn_2Fe_{24}O_{41}$. According to an analysis, the crystals were found to contain 0.22% by weight of FeO. The composition of the crystals thus corresponds to the formula $Sr_3Co_{1.93}Fe_{0.07}^{II}Fe_{24}^{III}O_{41}$.

*Example XI*

In the manner described in Example I, crystals were manufactured from a melt homogenized at 1200° C. and having a composition of 6.2 mol. percent of $BaCO_3$, 34.6 mol. percent of $SrCO_3$, 1.8 mol. percent of $CoCO_3$, 3.6 mol. percent of ZnO and 53.8 mol. percent of $Fe_2O_3$. At 1197° C., crystals were formed, one of which grew out considerably.

According to an X-ray diffraction examination, the crystal had a structure similar to that of the compound $Ba_3Zn_2Fe_{24}O_{41}$. According to an analysis, the ratio Ba:Sr in the crystal was 3:7, the crystal was found to contain 0.34% by weight of FeO and the ratio Co:Zn was equal to that in the initial mixture. The composition of the crystal thus corresponds to the formula $$Ba_{0.9}Sr_{2.1}Co_{0.63}Zn_{1.26}Fe_{0.11}^{II}Fe_{24}^{III}O_{41}$$

Although the invention has been described more particularly in connection with ferromagnetic oxidic compounds having a hexagonal crystal structure, it will be evident that the method is also applicable, if desired with the use of a flux, to the manufacture of monocrystalline bodies from other materials, both compounds and elements, such as germanium and silicon.

What is claimed is:

1. A method of making a single crystal from a homogeneous melt comprising the steps, directing a narrow flow of a cool gas at a portion of the surface of a homogeneous melt of a ferromagnetic oxidic compound from which a single crystal is to be formed and a flux while slowly cooling the melt to lower the temperature of said surface portion slightly below that of the remainder of the surface of the melt and thereby form a crystal solely in and from the melt, and removing the thus-formed crystal from the melt.

2. A method of making a single crystal as defined in claim 1 in which the single crystal is removed from the melt before the melt coagulates completely.

3. A method of making a single crystal from a melt as defined in claim 1 in which the ferromagnetic oxidic compound has a hexagonal crystal structure, the composition of which may be represented by the general formula $xAO \cdot yMeO \cdot zFe_2O_3$ where $x$ is greater than zero and $z$ is greater than $x+y$ and in which A is a bivalent metal selected from the group consisting of Ba, Sr, Pb, and Ca, and Me is a bivalent ion selected from the group consisting of $Fe^{++}$, $Mn^{++}$, $Co^{++}$, $Ni^{++}$, $Zn^{++}$, $Mg^{++}$, $Cu^{++}$ and $$\frac{Li^+ + Fe^{+++}}{2}$$

4. A method of making a single crystal from a melt as defined in claim 3 in which the flux consists of a composition containing AO and $Fe_2O_3$ in which the ratio of A:Fe varies from 1:1 to 1:2.

References Cited in the file of this patent

UNITED STATES PATENTS

| | | |
|---|---|---|
| 1,353,571 | Dreibrot | Sept. 21, 1920 |
| 2,045,301 | Langer | June 23, 1936 |
| 2,754,172 | Went et al. | July 10, 1956 |
| 2,762,777 | Went et al. | Sept. 11, 1956 |
| 2,762,778 | Gorter et al. | Sept. 11, 1956 |
| 2,837,483 | Hakker et al. | June 3, 1958 |
| 2,847,101 | Bergmann | Aug. 12, 1958 |
| 2,848,310 | Remeika | Aug. 19, 1958 |
| 2,927,008 | Shockley | Mar. 1, 1960 |
| 2,946,752 | Jonker et al. | July 26, 1960 |
| 2,946,753 | Jonker et al. | July 26, 1960 |
| 2,955,085 | Jonker et al. | Oct. 4, 1960 |
| 2,977,312 | Gorter et al. | Mar. 28, 1961 |

FOREIGN PATENTS

| | | |
|---|---|---|
| 1,110,334 | France | Oct. 12, 1955 |
| 1,110,819 | France | Oct. 19, 1955 |

OTHER REFERENCES

Erchak et al.: Jr. Amer. Chem. Soc., October 1946, p. 2000.